United States Patent
Choi et al.

(10) Patent No.: US 9,494,431 B2
(45) Date of Patent: Nov. 15, 2016

(54) METHOD FOR ACQUIRING OR PROVIDING UPDATE INFORMATION FOR ROUTE TO THIRD PARTY AND APPARATUS FOR SAME

(71) Applicant: LG ELECTRONICS INC., Seoul (KR)

(72) Inventors: Jaehyuk Choi, Anyang-si (KR); Hongbeom Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/365,000

(22) PCT Filed: Dec. 18, 2012

(86) PCT No.: PCT/KR2012/011066
§ 371 (c)(1),
(2) Date: Jun. 12, 2014

(87) PCT Pub. No.: WO2013/094961
PCT Pub. Date: Jun. 27, 2013

(65) Prior Publication Data
US 2014/0343845 A1 Nov. 20, 2014

Related U.S. Application Data

(60) Provisional application No. 61/577,080, filed on Dec. 18, 2011, provisional application No. 61/665,880, filed on Jun. 28, 2012, provisional application No. 61/668,412, filed on Jul. 5, 2012, provisional application No. 61/723,795, filed on Nov. 8, 2012.

(51) Int. Cl.
*G01C 21/10* (2006.01)
*G01C 21/20* (2006.01)
(Continued)

(52) U.S. Cl.
CPC .......... *G01C 21/20* (2013.01); *G01C 21/3438* (2013.01); *G01C 21/362* (2013.01);
(Continued)

(58) Field of Classification Search
CPC .......... G08G 1/205; G08G 1/096822; G01C 21/3438
See application file for complete search history.

(56) References Cited

U.S. PATENT DOCUMENTS

| 2004/0121784 A1 | 6/2004 | Park et al. |
| 2007/0100539 A1 | 5/2007 | Jang et al. |
| 2010/0312476 A1* | 12/2010 | Mueller et al. ............... 701/302 |

FOREIGN PATENT DOCUMENTS

| KR | 10-2004-0054838 A | 6/2004 |
| KR | 10-2005-0023098 A | 3/2005 |

(Continued)

*Primary Examiner* — Michael D Lang
(74) *Attorney, Agent, or Firm* — Birch, Stewart, Kolasch & Birch, LLP

(57) ABSTRACT

Provided is a method for providing update information for a route from a terminal to a destination to the terminal, wherein the destination is designated as location of the third party being moving, which is performed by a server and comprising: receiving location information of the terminal from the terminal; determining whether the location of the third party has been changed; generating update information for the route based on the received location information and the changed location of the third party upon determining that the location of the third party has been changed; and notifying the terminal of the update information according to types of the update information, wherein the location information of the terminal is received when the terminal deviates from or detours around the route, when the terminal enters a specific segment on the route set by the server, or when the terminal moves by a predetermined distance.

18 Claims, 10 Drawing Sheets

(51) Int. Cl.
  *G01C 21/34* (2006.01)
  *G08G 1/0968* (2006.01)
  *G01C 21/36* (2006.01)
  *H04L 29/08* (2006.01)
  *H04W 4/02* (2009.01)

(52) U.S. Cl.
  CPC ......... *G08G1/096844* (2013.01); *H04L 67/26* (2013.01); *H04W 4/021* (2013.01); *H04W 4/028* (2013.01); *H04W 4/023* (2013.01)

(56) References Cited

FOREIGN PATENT DOCUMENTS

| | | |
|---|---|---|
| KR | 10-2007-0061151 A | 6/2007 |
| KR | 10-2007-0081154 A | 8/2007 |
| KR | 10-2010-0038567 A | 4/2010 |

\* cited by examiner

METHOD FOR ACQUIRING OR PROVIDING UPDATE INFORMATION FOR ROUTE TO THIRD PARTY AND APPARATUS FOR SAME

CROSS REFERENCE TO RELATED APPLICATIONS

This application claims priority to and is a National Stage of International Application No. PCT/KR2012/011066 filed on Dec. 18, 2012, which claims priority to Provisional Application Nos. 61/577,080 filed on Dec. 18, 2011, 61/665,880 filed on Jun. 28, 2012, 61/668,412 filed on Jul. 5, 2012, and 61/723,795 filed on Nov. 8, 2012, which are incorporated by reference as if fully set forth herein.

TECHNICAL FIELD

One embodiment of the present invention relates to a method of providing/or acquiring a route or update information for the route in a case in which a destination of a trip is location of a third party and the location of the third party is changed.

BACKGROUND ART

Conventionally, there was used a method of a navigation terminal detecting a current location, i.e. an origin, through connection with a Global Positioning System (GPS) and computing a route based on a destination of a trip input by a user. In recent years, however, there has been utilized a service method of providing route information, real-time traffic information related to the route, and various other kinds of information from a server that provides traffic information and route information using Personal Navigation Devices (PNDs) in a mobile communication network according to population and improvement in performance of smart phones.

In particular, various kinds of navigation services are being now provided and Open Mobile Alliance (OMA) is standardizing a Dynamic Navigation Enabler (DynNav) that transmits real-time traffic information in a Peer to Peer (P2P) mode through an Internet Protocol (IP)-based network of a mobile communication network or a wireless network instead of a method of transmitting Traffic Protocol Expert Group (TPEG) information in a Digital Multimedia Broadcasting (DMB) network that provides information in a conventional broadcast form. In this standard, a navigation terminal and service of a smart phone is mainly classified into two forms.

In the first form, complex route computation is not performed by a navigation application equipped in a smart phone but is performed by a server that provides traffic information and route information and a corresponding route is transmitted to the smart phone. The second form is applied to a case in which route computation is performed by an application equipped in a smart phone according to the improvement in performance of the smart phone or a case in which a navigation terminal having a mobile communication modem mounted thereto perform route computation. In the second form, route information is not transmitted by a server that provides traffic information and, when a route computed by the terminal is registered with the server, only real-time traffic information related to the registered route is received from the server in a customized fashion in an IP-based P2P mode instead of a conventional broadcast form.

FIG. 1 is a view showing classification of a navigation device. The navigation device may be classified into a form 110 that additionally transmits TPEG-based traffic information transmitted through a broadcast network, such as DMB, a form 120 that additionally transmits traffic information based on IP, such as a mobile communication network or Wi-Fi, and a standalone form 130 that tracks location of a vehicle through connection with a GPS without connection with other communication media to create and provide route information.

In addition, the DynNav, which is being standardized by an open mobile alliance location working group (OMA LOC WG), belongs to the form 120 that transmits IP-based traffic information. More specifically, the DynNav belongs to a form that transmits traffic information in a P2P mode. In the DynNav, the navigation device is classified into the following two devices.

1. Smart ND: A device that can perform route computation and, therefore, requests only real-time traffic information without receiving route information through a DynNav server 2. Lightweight ND: A device that cannot perform route computation and, therefore, requests all kinds of real-time traffic information including route information through a DynNav server In a conventional DynNav system, a procedure of requesting and transmitting corresponding traffic information is performed in a RESTful mode. As a result, the following route information types may be used. Each information type may be defined through XML Schema Definition (XSD).

1) Trip Structure: Information that a terminal initially receives from a user to set a route. Information basically having the same origin and destination is acquired and then transmitted to a server. The trip structure includes a subset corresponding to a plurality of route structures.

TABLE 1

| Element | Type | Optional | Description |
| --- | --- | --- | --- |
| originWGS84 | Location_Point | Yes | Location information of an origin expressed as WGS84 (Location_Point structure is defined in tpeg-locML [TTI LOC]. At least one element originWGS84 or originAddress MUST be specified.) |
| originAddress | Civic Location Format | Yes | Location information of an origin expressed in a Civic Location Format (Civic Location Format is defined by IETF [RFC 5139]. At least one element originWGS84 or originAddress MUST be specified.) |

TABLE 1-continued

| Element | Type | Optional | Description |
|---|---|---|---|
| destinationWGS84 | Location_Point | Yes | Location information of a destination expressed as WGS84 (Location Point structure is defined in tpeg-locML [TTI LOC]. At least one element destinationWGS84 or destinationAddress MUST be specified.) |
| destinationAddress | Civic Address Format | Yes | Location information of a destination expressed in a Civic Location Format (Civic Location Format is defined by IETF [RFC 5139]. At least one element destinationWGS84 or destinationAddress MUST be specified.) |
| waypoints | Location_Point [0 . . . unbounded] | Yes | Location information of an en route stop (described in WGS84 format) (Location_Point structure is defined in tpeg-locML [TTI LOC].) |
| startingTime | xsd:dateTime | Yes | Starting time of navigation service (scheduled navigation service time is specified as service starting time when the service starting time is specified (Planned trip) and current time is specified as service starting time when the service starting time is not specified (Starting time of the planned trip. If not present, current time is assumed.) |
| tollRoad | xsd:boolean | Yes | Confirming whether going via a toll road is allowed (If true or not present, toll road are allowed.) |
| vehicleType | Vehicle_Info | Yes | Information of vehicle under operation (Vehicle_Info structure is defined in tpeg-rtmML [TTI RTM]) |
| calculateRoute | xsd:boolean | Yes | Confirming whether a route computed by a server is provided (If false or not present, server should not propose routes.) |
| link | common:Link [0 . . . unbounded] | Yes | Link information for routes defined in a trip (Links to routes related to the trip. Attribute "rel" must be set to "Route".) |
| resourceURL | xsd:anyURI | Yes | Self-referring URL information (Self-referring URL. SHALL NOT be included in POST requests, MUST be included in responses to any HTTP method that returns an entity body, and in PUT requests.) |

2) Route Structure: A mode to express all routes computed through the trip structure. The route structure is expressed as several segments.

TABLE 2

| Element | Type | Optional | Description |
|---|---|---|---|
| travellingTime | xsd:float | Yes | Route travelling time (Total travelling time (in minutes) for the route) |
| distance | xsd:float | Yes | Total route distance (Total distance (in Km) of the route) |
| origin | Location_Point | No | Start point of a route (expressed in a WGS84 format) (Location_Point structure is defined in tpeg-locML [TTI LOC].) |
| segment | Segment [1 . . . unbounded] | No | Each segment constituting a route (Sequence of road segments that form the route) |
| trafficEvents | CategorizedEventList Reference [0 . . . unbounded] | Yes | Link information approaching traffic information resources (List of traffic events as defined in tpeg-rtmML [TTI RTM], grouped into categories.) |
| link | common:Link | Yes | Reference to the route for which it is proposed as alternative. Attribute "rel" must be set to "Route". |
| resourceURL | xsd:anyURI | Yes | Self-referring URL information (Self-referring URL. SHALL NOT be included in POST requests, MUST be included in responses to any HTTP method that returns an entity body, and in PUT requests.) |

3) Segment Structure: A structure expressing each segment. Length of each segment and a real-time traffic situation corresponding to a corresponding segment may be defined in a TPEG format.

TABLE 3

| Element | Type | Optional | Description |
|---|---|---|---|
| endPoint | Location_Point | No | Ending point information of each segment (expressed in a WGS84 format) (Location_Point structure as defined in tpeg-locML [TTI LOC]. The starting point of the segment should be assumed equal to the ending point of the previous segment (or the trip origin for the first segment)) |
| midwayPoint | Location_Point [0 . . . unbounded] | Yes | Location_Point structure as defined in tpeg-locML [TTI LOC]. |
| linkName | xsd:string | Yes | Name information of a segment (Name of the road that the segment belongs to) |
| distance | xsd:float | Yes | Segment length (Length of the segment in km) |
| travellingTime | xsd:float | Yes | Average travelling time of each segment (Estimated time to cover the segment expressed in minutes, it includes regular travelling time and delay) |
| delay | xsd:float | Yes | Delay or congestion time of each segment (Estimated delay along the segment expressed in minutes) |
| speed | xsd:float | Yes | Possible average section speed information of a vehicle in each segment (Estimated speed along the segment expressed in m/s) |
| performance | xsd:string | Yes | Information regarding a traffic situation (Levels of the information may be expressed as delay, congestion, and serious delay) (Description of traffic conditions along the segment. This field should be encoded according to tpeg rtmML definition [TTI RTM].) |

In such an IP-based route provision method, it is necessary to perform a procedure of providing or acquiring the route in a case in which in a case in which a destination of a trip is location of a third party. In particular, it is necessary to provide a method of providing route information to the terminal since the location of the third party is changed.

DISCLOSURE

Technical Problem

The present invention proposes a method of providing/or acquiring update information for a route of a trip in a case in which a destination of the trip is location of a third party and the location of the third party is changed with the result that destination information is changed.

Technical Solution

One embodiment of the present invention provides a method of providing update information for a route including at least one segment from a terminal to a destination to the terminal, wherein, as the destination is defined as an identifier (ID) of a third party, update information for a route in which the destination is designated as location of the third party is provided, the method being performed by a server, the method including receiving location information of the terminal from the terminal, determining whether the location of the third party has been changed upon receiving the location information of the terminal, generating update information for the route based on the received location information of the terminal and the changed location of the third party upon determining that the location of the third party has been changed, and notifying the terminal of the update information according to types of the update information, wherein the location information of the terminal is received when the terminal deviates from or detours around the route, when the terminal enters a specific segment on the route set by the server, or when the terminal moves by a predetermined distance.

Preferably, a notification policy of the update information may be applied according to the types of the update information.

Preferably, the update information may include a first type indicating a case in which the changed location of the third party is in a last segment of the route, a second type indicating a case in which at least one segment is additionally needed to the route to reach the changed location of the third party, and a third type indicating a case in which at least one segment is additionally needed to the route to reach the changed location of the third party and an alternative route exists in addition to the route.

Preferably, if the update information is the first type or the second type, the method may further include notifying the terminal of the update information when the terminal enters a specific segment on the route around the destination.

Preferably, if the update information is the third type, the method may further include notifying the terminal of the update information immediately when the update information is generated.

Preferably, the specific segment on the route may be indicated by a positionUpdate element contained in information for each of segments of the route.

Preferably, if the positionUpdate element is set to true, the location information of the terminal may be received from the terminal when the terminal enters a segment containing the positionUpdate element set to true.

Preferably, the method may include receiving a request for notifying of the update information from the terminal, wherein the request for notifying of the update information contains a tracking3rdParty element, wherein if the tracking3rdParty element is set to true, the server may be configured to track the location of the third party and to notify of availability of the update information.

Another embodiment of the present invention provides a method of acquiring update information for a route including at least one segment from a terminal to a destination from a server, wherein, as the destination is defined as an identifier (ID) of a third party, update information for a route in which the destination is designated as location of the third party is provided, the method being performed by the terminal, the method including transmitting location information of the terminal to the server, receiving a notification of update information on the route based on the location information of the terminal and changed location of the third party from the server, the update information being generated by the server, and the notification being transmitted by the server according to types of the update information, and accessing the update information, wherein it is determined whether the location of the third party has been changed if the location information of the terminal is received by the server, the update information is generated based on the location information of the terminal received by the server and the changed location of the third party when it is determined that the location of the third party has been changed, and the location information of the terminal is transmitted when the terminal deviates from or detours around the route, when the terminal enters a specific segment on the route set by the server, or when the terminal moves by a predetermined distance.

Preferably, a notification policy of the update information may be applied according to the types of the update information.

Preferably, the update information may include a first type indicating a case in which the changed location of the third party is in a last segment of the route, a second type indicating a case in which at least one segment is additionally needed to the route to reach the changed location of the third party, and a third type indicating a case in which at least one segment is additionally needed to the route to reach the changed location of the third party and an alternative route exists in addition to the route.

Preferably, if the update information is the first type or the second type, the server may notify the terminal of the update information when the terminal enters a specific segment on the route around the destination.

Preferably, if the update information is the third type, the server may notify the terminal of the update information immediately when the update information is generated.

Preferably, the specific segment on the route may be indicated by a positionUpdate element contained in information for each segment of the route.

Preferably, if the positionUpdate element is set to true, the location information of the terminal may be received from the terminal when the terminal enters a segment containing the positionUpdate element set to true.

Preferably, the method may include transmitting a request for notifying of the update information to the server, wherein the request for notifying of the update information contains a tracking3rdParty element, wherein the tracking3rdParty element is set to true, the server may be configured to track the location of the third party and to notify of availability of the update information.

Another embodiment of the present invention provides a server configured to provide update information for a route including at least one segment from a terminal to a destination to the terminal, wherein, as the destination is defined as an identifier (ID) of a third party, update information for a route in which the destination is designated as location of the third party is provided, the server including a transceiver configured to communicate with the terminal and a processor configured to generate update information for the route based on information received from the terminal, wherein the processor is configured to receive location information of the terminal from the terminal through the transceiver, to determine whether the location of the third party has been changed upon receiving the location information of the terminal, to generate update information based on the received location information of the terminal and the changed location of the third party upon determining that the location of the third party has been changed, and to notify the terminal of the update information through the transceiver according to types of the update information, and wherein the location information of the terminal is received when the terminal deviates from or detours around the route, when the terminal enters a specific segment on the route set by the server, or when the terminal moves by a predetermined distance.

Preferably, a notification policy of the update information may be applied according to the types of the update information.

A further embodiment of the present invention provides a terminal configured to acquire update information for a route including at least one segment from a terminal to a destination from a server, wherein, as the destination is defined as an identifier (ID) of a third party, update information for a route in which the destination is designated as location of the third party is provided, the terminal including a transceiver configured to communicate with the server and a processor configured to acquire update information for the route based on information received from the server, wherein the processor is configured to transmit location information of the terminal to the server through the transceiver, to receive a notification of update information based on the location information of the terminal and changed location of the third party from the server, wherein the update information is generated by the server, and the notification is transmitted by the server according to types of the update information, and to access the update information, wherein it is determined whether the location of the third party has been changed when the location information of the terminal is received by the server, the update information is generated based on the location information of the terminal received by the server and the changed location of the third party when it is determined that the location of the third party has been changed, and the location information of the terminal is transmitted when the terminal deviates from or detours around the route, when the terminal enters a specific segment on the route set by the server, or when the terminal moves by a predetermined distance.

Preferably, a notification policy of the update information may be applied according to the types of the update information.

The above technical solutions are merely some embodiments of the present invention and various embodiments into which the technical features of the present invention are incorporated may be derived and understood by those skilled in the art from the detailed description of the present invention which follows.

Advantageous Effects

In accordance with embodiments of the present invention, it is possible to provide or acquire a route in which a destination is location of a third party. In addition, it is possible to efficiently notify of and access update information for the route in a case in which the location of the third party is changed.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
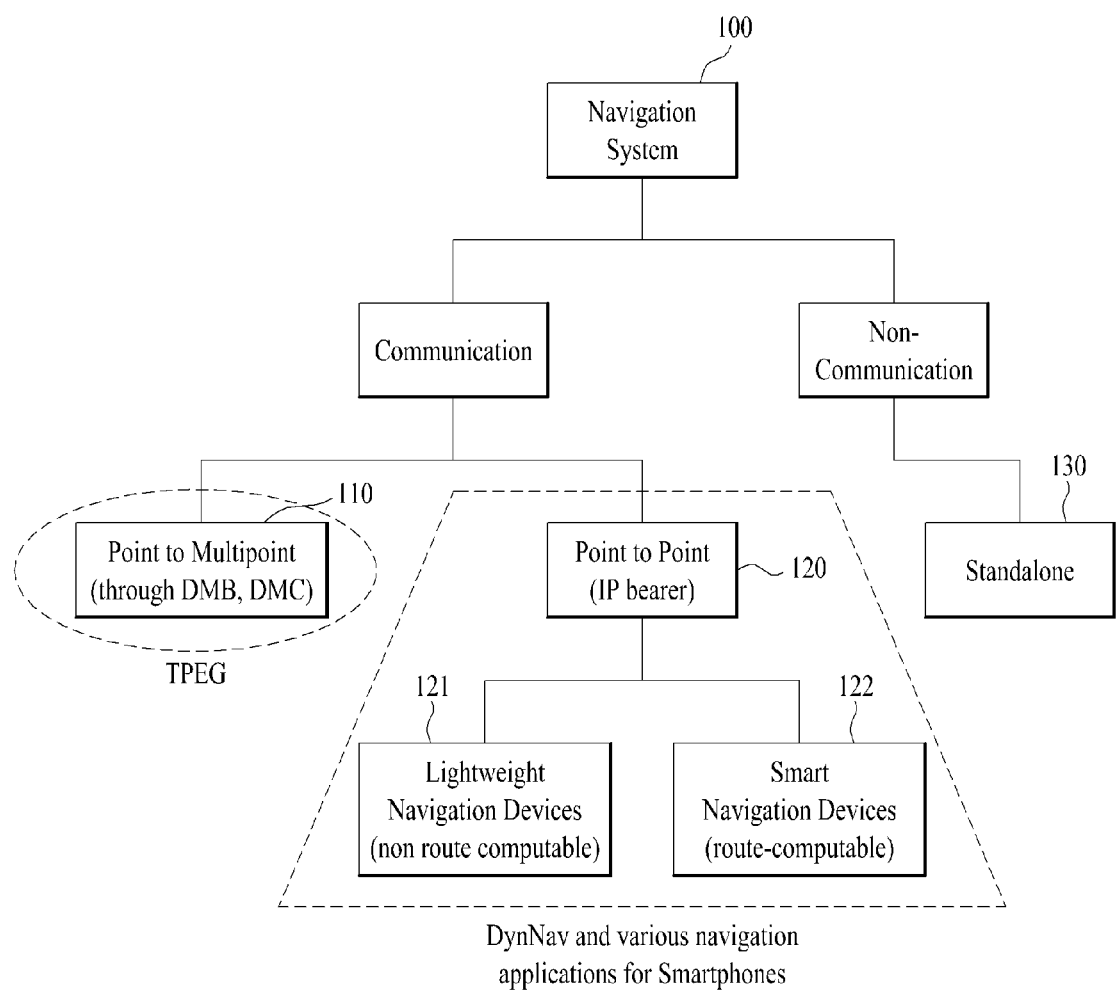
FIG. 1 is a view showing classification of a navigation device.

The terminology used herein is for the purpose of describing particular embodiments only and is not intended to be limiting of the present invention. Unless otherwise defined, all technical terms used herein have the same meaning as commonly understood by one of ordinary skill in the art to which this present invention belongs and will not be interpreted in overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

As used herein, the singular forms are intended to include the plural forms as well, unless the context clearly indicates otherwise. It will be further understood that the terms "comprises" or "includes" are not intended to include all elements or all steps described herein, but do not preclude exclusion of some elements or steps described herein or addition of one or more other elements or steps.

It will be understood that, although the terms first, second, etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element is referred to as being "on", "connected to" or "coupled to" another element, it may be connected or coupled to the other element or intervening elements may be present. In contrast, when an element is referred to as being "directly connected to" or "directly coupled to" another element, there are no intervening elements present.

Hereinafter, the present invention will be described in detail by explaining exemplary embodiments of the invention with reference to the attached drawings. The same reference numerals in the drawings denote like elements, and a repeated explanation thereof will not be given. In the description of the present invention, certain detailed explanations of related art are omitted when it is deemed that they may unnecessarily obscure the essence of the invention. The features of the present invention will be more clearly understood from the accompanying drawings and should not be limited by the accompanying drawings. It is to be appreciated that all changes, equivalents, and substitutes that do not depart from the spirit and technical scope of the present invention are encompassed in the present invention.

Although various kinds of terminals or devices are shown in the drawings, each of the terminals or devices may be referred to as a user equipment (UE), a mobile equipment (ME), a mobile station (MS), a user terminal (UT), a subscriber station (SS), a wireless device, a handheld device, or an access terminal (AT). In addition, each of the terminals or devices may be a portable instrument, such as a mobile phone, a personal digital assistant (PDA), a smart phone, a wireless modem, or a laptop computer, having a communication function. Alternatively, each of the terminals or devices may be a non-portable instrument, such as a personal computer (PC) or a vehicle-equipped device.

Hereinafter, terms used herein will be defined.

Application

In this specification, the application means an implementation of a well-defined but not standardized set of functions that performs work on behalf of the user. The application may consist of software and/or hardware elements and associated user interfaces (An implementation of a well-defined but not standardized set of functions that performs work on behalf of the user. It may consist of software and/or hardware elements and associated user interfaces).

Server

Generally, in a technical art to which the present invention pertains, the server corresponds to an entity that provides resources to clients in response to requests (An entity that provides resources to Clients in response to requests).

Client

Generally, in a technical art to which the present invention pertains, the client corresponds to a device, a user agent, or another entity that acts as the receiver of a service (A device, user agent, or other entity that acts as the receiver of a service).

DynNav Application

In this specification, DynNav corresponds to an entity that is in charge of interacting with a DynNav server to get an optimal route(s), real-time and forecasted traffic information and complimentary data (An entity that is in charge of interacting with a DynNav Server to get optimal route(s), real-time and forecasted traffic information and complimentary data). Consequently, the DynNav application is equipped in a terminal including a smart phone, a mobile phone, and a navigation device. In this specification, therefore, the DynNav application may be mutually referred to as a terminal. In this aspect, the DynNav application corresponds to a kind of client.

DynNav Server

In this specification, the DynNav server corresponds to an entity that is in charge of providing an optimal route(s), real-time and forecasted traffic information, and complimentary data to the application (An entity that is in charge of providing to the application optimal route(s), real-time and forecasted traffic information, and complimentary data). In this aspect, the DynNav server corresponds to a kind of the server.

Lightweight LD

In this specification, the lightweight LD means a navigation device that does not have a route computation function and requests and receives a computed route from the server. The lightweight LD corresponds to a navigation device that accesses a server for route estimation functions and for retrieving roads shape representation if not available in a local map database (A navigation device that accesses to a server for route estimation functionalities and for retrieving roads shape representation, if not available in a local map database).

Location URI

In this specification, the location URI corresponds to a URI that enables the current location of a device to be obtained from a particular location server using a protocol for obtaining location (A URI that enables the current location of a device to be obtained from a particular location server using a particular dereferencing protocol).

Navigation Device (ND)

In this specification, the navigation device corresponds to an entity that, using a Global Navigation Satellite System (GNSS) service, assists the driver showing a correct route to arrive at the final destination. This entity may process real-time and predicted traffic information and dynamically estimate the optimal route, according to user preferences (An entity that, using GNSS (Global Navigation Satellite System) service, assists the driver showing correct route to arrive at the final destination. This entity may process real-time and predicted traffic information and dynamically estimates the optimal route, according to user preferences).

Point of Interest (POI)

In this specification, the point of interest describes information about locations such as name, category, unique identifier, or civic address (POI describes information about locations such as name, category, unique identifier, or civic address).

Segment

The segment is a unit for classifying roads. In a general road, a road connected between an intersection and another intersection is defined as a segment. In an expressway, a road classified according to policy of each expressway is defined as a segment. A traffic jam or transit time may be decided based on such a segment. In this specification, the segment is mutually referred to as a road section.

Polyline

In this specification, the polyline corresponds to a continuous line used in graphic computing composed of one or more line segments, defined by specifying the endpoints of each segment (A continuous line used in graphic computing composed of one or more line segments, defined by specifying the endpoints of each segment).

Route Information

In this specification, the route information corresponds to coordinates of segment sets and complimentary data from the defined origin and the destination (Information which coordinates of segment end points and complimentary data from the defined origin and the destination).

Smart ND

In this specification, the smart ND corresponds to a navigation device that is able to calculate a route(s), using a road network database available on the device itself (A navigation device that is able to calculate the route(s), using a roads network database available on the device itself).

Traffic Information

In this specification, the traffic information corresponds to information which consists of traffic events and network performance parameters related to an area or a route (Information which consists of traffic events and network performance parameters related to an area or a route). In addition, the traffic information may include current or future traffic information.

Traffic Event

In this specification, the traffic event corresponds to information regarding events related to an area or a route that are either imposed or planned by the road network operator (i.e. road works leading to lane closures) or events that occur outside the control of the network operator (i.e. accidents) (Information regarding events related to an area or a route that are either imposed or planned by the road network operator (i.e. road works leading to lane closures) or events that occur outside the control of the network operator (i.e. accidents)).

Network Performance Parameter

In this specification, the network performance parameter corresponds to information regarding the performances or a traffic flow (i.e. speed, delay, and travel time) of segments related to an area or a route (Information regarding the performances (i.e. speed, delay and travel time) of road segments related to an area or a route).

Route Information in Full Format

The route information in full format means a kind of route information including all segments from the origin and the destination. Unless mentioned otherwise, route information means all routes.

Route Information in Summarized Format

The route information in summarized format means a kind of route information including only a segment selected from among all segments from the origin and the destination for summarizing information (a selection method is not described in the present invention).

The present invention relates to a navigation system, method, and device reflecting real-time traffic information and, more specifically, to a navigation system, method, and device that transmit real-time traffic information from a traffic information provision server to the navigation device using a minimum communication bandwidth in a case in which the navigation device can compute a route and has a communication modem that can be connected to a mobile communication network in a system that provides real-time traffic information. In addition, the present invention relates to a navigation system, method, and device that transmit an optimal route and real-time traffic information from a traffic information provision server to the navigation device in a case in which the navigation device can be connected to a mobile communication network even in a case in which the navigation device cannot compute a route.

In recent years, a navigation service for providing a movement route to a mobile communication terminal has been generalized instead of using the existing digital multimedia broadcasting (DMB) network with active popularization of smart phones. In an open mobile alliance location working group (OMA LOC WG), the above service is referred to as dynamic navigation (DynNav).

In this specification, the navigation device is referred to as a device that can perform a route guidance function. The navigation device includes all electronic devices, such as a smart phone, a mobile phone, a mobile device, a laptop computer, a tablet PC, and a smart pad, which are portable or can be attached to portable objects.

Figure 2:
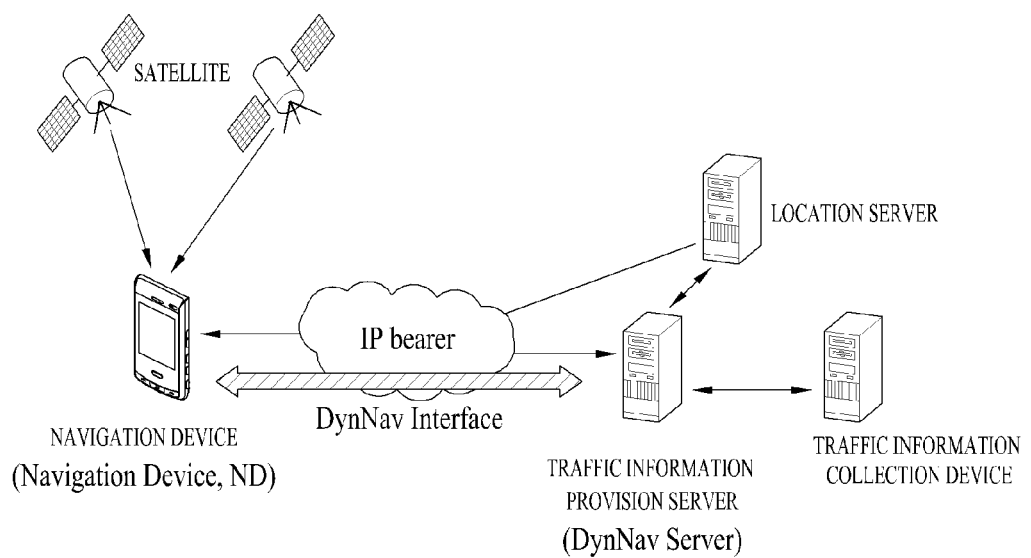
FIG. 2 is a view showing a network configuration to generally explain an IP-based DynNav system, which is a navigation system according to the present invention.

FIG. 2 is a view showing a network configuration to generally explain an IP-based DynNav system, which is a navigation system according to the present invention. As shown in FIG. 2, the navigation system according to the present invention may include a navigation device (ND) that can access a mobile communication network, a mobile communication network for wireless transmission and reception, a traffic information collection device for providing traffic information, a traffic information and route information provision server (DynNav server), a location server for creating and transmitting assistance data necessary to acquire location of the navigation device.

For simplicity of expression, in this specification, the traffic information and route information provision server or the DynNav server is expressed as a "server" and the navigation device is expressed as a "terminal" or "ND". The navigation device may be expressed as a "smart ND" or "lightweight ND" according to capability of the terminal.

In the present invention, the terminal (which may be divided into two terminal forms as mentioned above) may be connected to an IP network, such as a mobile communication network or Wi-Fi, as shown in the drawing. The terminal may have a navigation application for route guidance. The application may access the server to receive route guidance data and real-time traffic information for route guidance. Although not shown, on the other hand, a terminal that can compute a route may selectively receive real-time traffic information from the server without receiving route guidance data from the server.

The real-time traffic information means optimal route information computed by the DynNav server and transmitted to the terminal, real-time and forecasted traffic information, and additional information, such as point of interest (POI) and weather, related to traffic. In addition, the navigation application or the terminal is genetically expressed as the terminal to avoid of duplication of expression. In this specification, therefore, the "terminal," "ND," "smart ND," "lightweight ND," and "navigation application" may be referred to as the "terminal."

Figure 3:
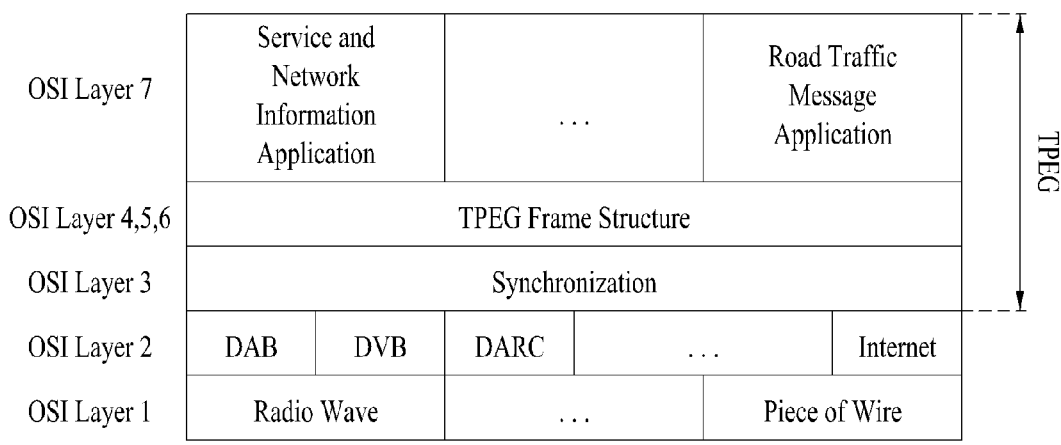
FIG. 3 is a view showing a layer structure of Transport Protocol Experts Group (TPEG)

The real-time traffic information as mentioned above may be expressed through Transport Protocol Experts Group (TPEG) promoted by an ISO standardization organization. The TPEG means a standard protocol for transmitting traffic and trip information through a digital broadcasting network. As shown in FIG. 3, a layer structure of TPEG corresponds to a network layer (third layer) to an application layer (seventh layer) of an ISO/OSI layer model. The network layer defines TPEG frame synchronization and routing. Components of each application are combined into one stream in a packetization layer of fourth, fifth, and sixth layers. Each message standard corresponds to a seventh layer, which is an application layer. The DynNav may provide real-time traffic information to the terminal according to a real-time traffic information expression mode of the TPEG. The DynNav may use additional expression mode.

Figure 4:
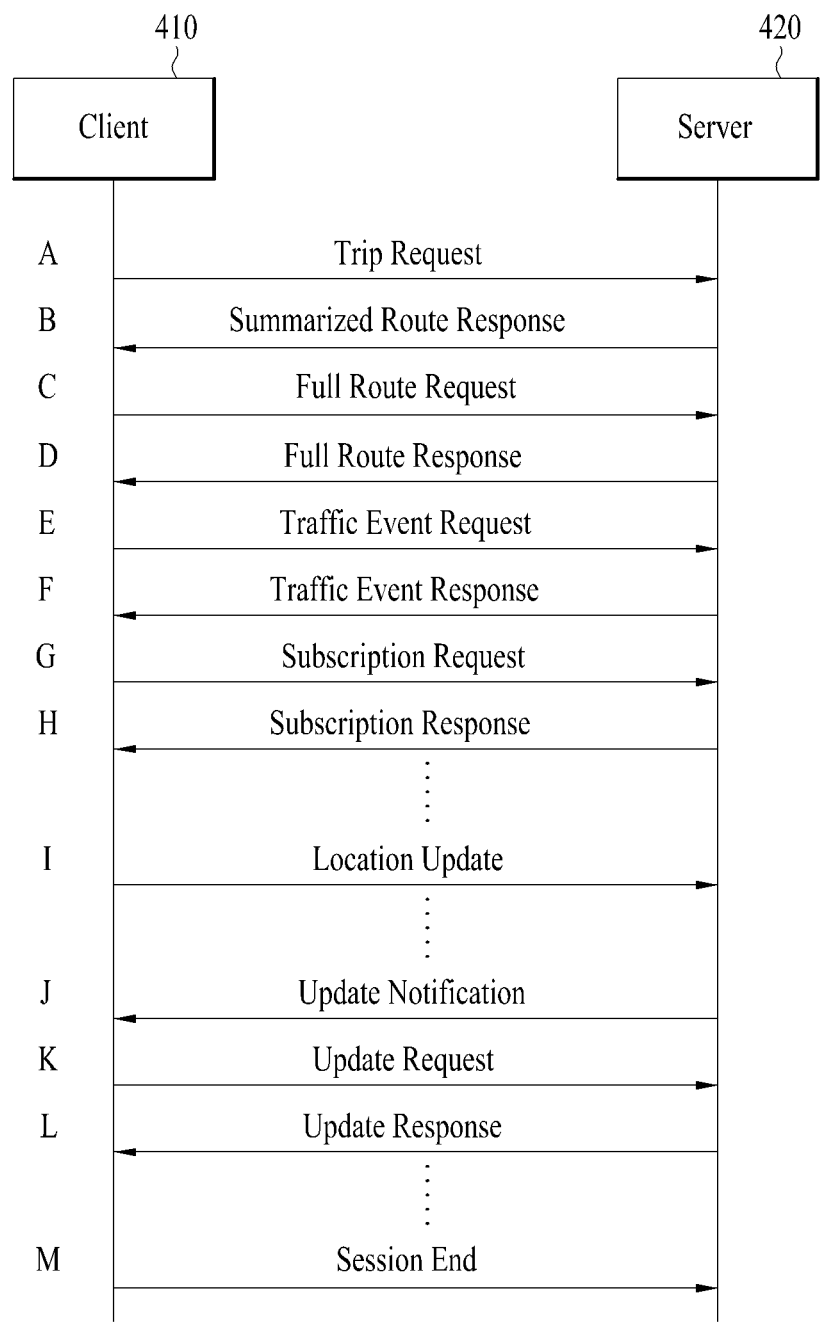
FIG. 4 is a flowchart showing operation according to an embodiment of the present invention.

FIG. 4 is a flowchart showing operation according to an embodiment of the present invention.

As previously described, an application 410 corresponds to a DynNav application and may be referred to as a "terminal." In the description related to FIG. 4, therefore, the application will be referred to as the "terminal." In addition, as previously described, a server 420 corresponds to a DynNav server. Furthermore, in embodiments of the present invention, the terminal corresponds to a lightweight ND as previously described.

In an embodiment of the present invention, a trip destination is a location of a third party. An embodiment of the present invention proposes a method of providing/acquiring a route or update information for the route in a case in which the location of the third party is changed. In this case, the destination may be defined as an identifier (ID) of the third party. The server may acquire the location of the third party through an external location application or server.

In a case in which the destination is the location of the third party that can be changed, i.e. in a case in which the ID of the third party is used as the destination, the destination may be changed according to the movement of the third party. In this case, it is necessary for the server to notify the terminal of the update information based on the change of the destination. Types of the update information are classified into (1) update of the destination (or change of the destination), (2) an additional segment (or an additional route), and (3) an alternative route, which will hereinafter be described. Meanwhile, the server may control a point of time when the update information is notified to reduce the number of times of interaction, access, or communication between the terminal and the server. For example, only in a case in which the terminal approaches the trip destination, i.e. the location of the third party, within a predetermined range, i.e. in a case in which the terminal enters a specific segment on the route, the server may perform such a notification, which will hereinafter be described.

The terminal 410 sends a trip request to the server 420 to request a route to the destination, i.e. the third party (step A). The trip request includes information regarding the origin and the destination. The terminal may provides location information or address information as the origin or the server may check location of the terminal to set the checked location of the terminal as the origin. In the present invention, as previously described, the destination is provided as the ID of the third party.

The server 420 checks location of the third party based on the ID of the third party received at step A. The location of the third party may be checked using various methods (for example, SUPL), which is not described in the present application. The server 420 generates one or more route from the origin to the destination using the checked location of the third party as the destination. The server 420 generates summarized routes of the routes based on the generated routes and transmits the summarized routes to the terminal 410 (step B). In addition, the server 420 provides information regarding the acquired location of the third party as destination information.

The terminal 410 selects a route to be actually used from among the summarized routes received at step B and requests a full route for the selected summarized route (step C). The server 420 transmits the full route requested by the terminal 410 to the terminal 410 (step D).

The terminal 410 requests from the server 420 traffic event information for the full route received from the server 420 (step E).

The server 420 transmits the traffic event information requested from the terminal 410 to the terminal 410 (step F).

The terminal 410 subscribes a notification service to the server 420 (step G). The terminal 410 may request a notification service to track the location of the third party and, when update information based on the change in location of the third party is generated, to transmit the same from the server 420. This may be performed using an external entity. To this end, various methods may be used (for example, SULP SLP). When the following conditions occur, the terminal 410 receives a notification from the server 420.

a. A network performance parameter for a route is updated or new traffic event information is generated.

b. A traffic jam occurs and an alternative route is suggested.

c. Update information is generated due to movement of the third party (the destination is changed, an additional route is generated, and an alternative route is suggested).

At this time, when the terminal 410 subscribes a notification service, the terminal 410 requests the server 420 to continuously track the location of the third party. If there is no request, the above condition c does not occur. This will be described in detail with reference to FIG. 5 and Table 6. The server 420 notifies the terminal 410 that the subscription of the notification service has been successfully achieved (step H).

The terminal 410 periodically transmits the location of the terminal 410 to the server 420 (step I).

Conditions in which the terminal 410 transmits the location of the terminal 410 to the server 420 are as follows.

a. In a case in which the terminal 410 deviates from or detours around a received route, the terminal 410 transmits the location of the terminal 410 to the server 420.

b. Whenever the terminal 410 moves by a predetermined distance, the terminal 410 transmits the location of the terminal 410 to the server 420.

c. When the server 420 provides the full route to the terminal 410, the server 420 designates a segment at which the terminal 410 will transmit the location of the terminal 410 to the server 420. When the terminal 410 enters a corresponding segment, the terminal 410 transmits the location of the terminal 410 to the server 420.

The server 420 transmits a notification for provision of update information to the terminal 410 (step J). This notification is performed only when the terminal 410 makes a request from the server 420 at step G.

Kinds of update information that can be additionally provided are as follows.

a. A network performance parameter for a route is updated or new traffic event information is generated.

b. A traffic jam occurs and an alternative route is suggested.

c. Update information is generated due to movement of the third party (the destination is changed, an additional route is generated, and an alternative route is suggested).

Meanwhile, in a case in which the above condition c is applied, the server 420 may conditionally transmit the notification. For example, in a case in which a route to be newly generated from the most recently provided route due to movement of the third party, such as change of the destination or generation of an additional route, is relatively greatly different from the most recently provided route, the notification may be delayed as long as possible to reduce the number of times of communication between the terminal 410 and the server 420 and the number of times of using a communication network in consideration of characteristics of the third party who can move. That is, according to an embodiment of the present invention, the notification by the server 420 is conditionally performed to improve efficiency of the notification service. In addition, it is possible to efficiently provide/acquire a route or update information for the route in a case in which the destination is the third party. This will be described in detail with reference to FIGS. 5 and 6 to 8.

The terminal 410 requests update information from the server 420 (step K). The server 420 provides the update information to the terminal 410 (step L).

After arrival at the destination, the terminal 410 requests session end from the server 420 and ends the session (step M). The server 420 having received the request of the session end also ends the session.

Meanwhile, in the embodiment related to FIG. 4, all of step A to step M may be sequentially performed. Alternatively, some of the steps may be separately performed. For example, step A to step D may be performed as a separate procedure of requesting and receiving a route for one trip, step E and step F may be performed as a separate procedure of requesting and receiving traffic event information, step G and step H may be performed as a separate procedure of subscribing a notification service to the server, step I and step J may be performed as a separate procedure of generating/notifying update information according to the change in location of the terminal and the change in location of the third party as the destination, and step K and step L may be performed as a separate procedure of acquiring/providing the update information. In addition, some of the above-described groups of the steps may be combined and performed.

Figure 5:
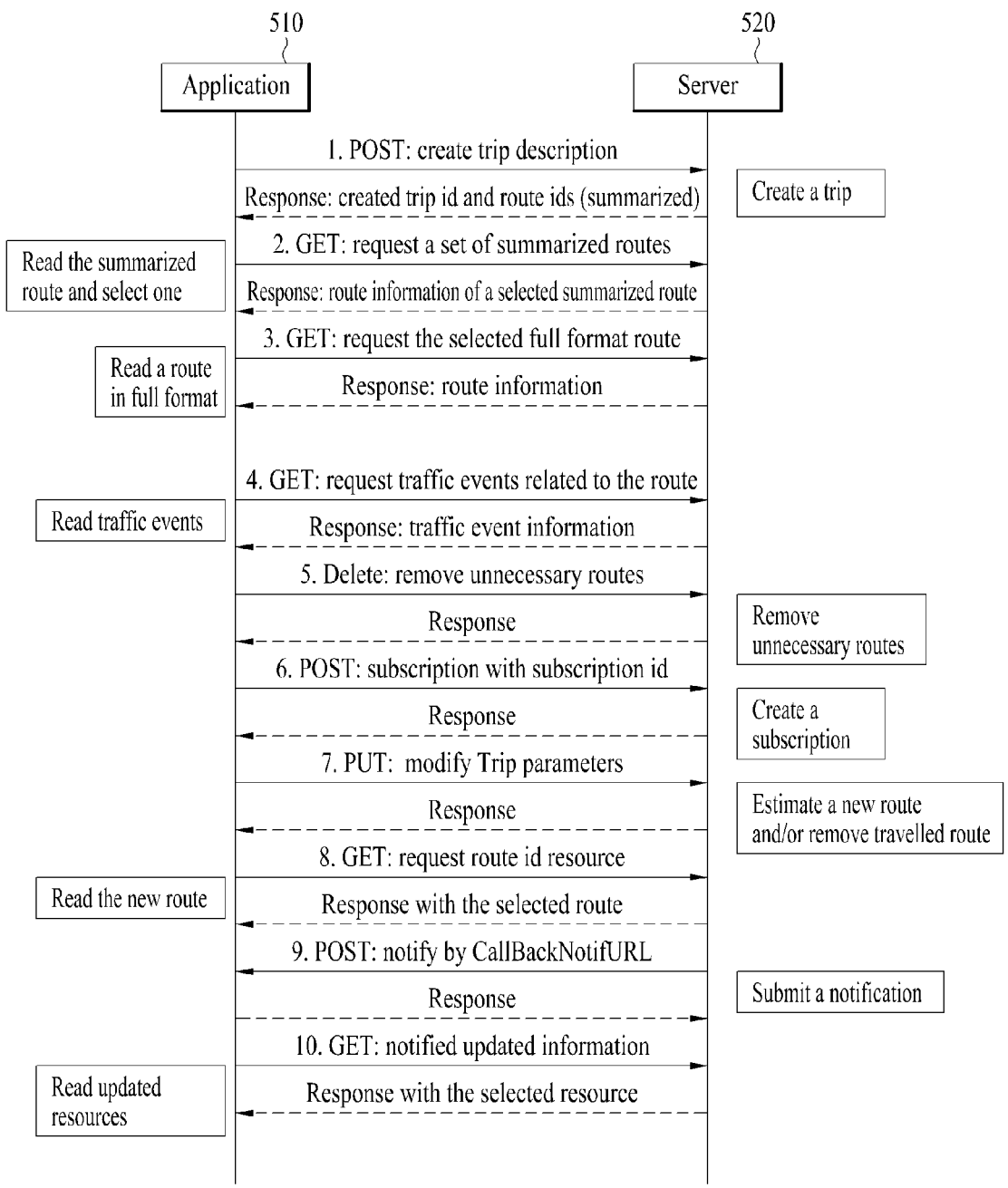
FIG. 5 is a flowchart showing operation according to an embodiment of the present invention.

FIG. 5 is a flowchart showing operation according to an embodiment of the present invention in detail.

As previously described, an application 510 corresponds to a DynNav application and may be referred to as a "terminal." In the description related to FIG. 4, therefore, the application will be referred to as the "terminal." In addition, as previously described, a server 520 corresponds to a DynNav server. In embodiments of the present invention, the terminal corresponds to a lightweight ND as previously described.

In an embodiment of the present invention, a trip destination is a location of a third party. An embodiment of the present invention proposes a method of providing/acquiring a route or update information for the route in a case in which the location of the third party is changed. In this case, the destination may be defined as an ID of the third party. The server may acquire the location of the third party through an external location application or server.

In a case in which the destination is the location of the third party that can be changed, i.e. in a case in which the ID of the third party is used as the destination, the destination may be changed according to the movement of the third party. In this case, it is necessary for the server to notify the terminal of the update information based on the change of the destination. Types of the update information are classified into (1) update of the destination (or change of the destination), (2) an additional segment (or an additional route), and (3) an alternative route, which will hereinafter be described. Meanwhile, the server may control a point of time when the update information is notified to reduce the number of times of interaction, access, or communication between the terminal and the server. For example, only in a case in which the terminal approaches the trip destination, i.e. the location of the third party, within a predetermined range, i.e. in a case in which the terminal enters a specific segment on the route, the server may perform such a notification, which will hereinafter be described.

1. POST: Create Trip Description

The terminal 410 may create a trip description through trip parameters defined by a user of the terminal, i.e. origin and destination information, using a POST command. In a case in which the trip destination is the third party, on the other hand, the following elements may be added to Table 1 showing a trip structure for expressing the same.

TABLE 4

| Element | Type | Optional | Description |
|---|---|---|---|
| destination3rdParty | xsd:string | Choice | Indicating ID of third party to be used as a destination ($3^{rd}$ party ID is used for retrieving the $3^{rd}$ party's position and the position is used as a destination of the trip. One element among destinationWGS84, destinationAddress, or destionation3rdParty MUST be specified when Trip resource is created.) |
| thirdPartyIDType | ThirdPartyIDTypeList | Yes | Indicating which type of the third party ID is used (Indicate which type of the $3^{rd}$ party ID is used in the destination3rdParty element. If destination3rdParty is present, thirdPartyIDType MUST be present.) |

Types, such as logical name, MISSDN, email address, SIP URI, IMS Public Identity, MIN, MDN, and URI, may be used as the ID of the third party. In response thereto, the server 1320 may compute a set of routes for the trip using related traffic information and make a response as expression of "trip" resources including route IDs of the computed routes.

2. GET: Request a Set of Summarized Routes

The terminal may access a set of summarized routes using a GET command based on performance parameters for a main road section of the route. This step may be repeated for all of the routes computed by the server. In a case in which the length and complexity of the trip are limited and the network quality is proper, however, full route information may have already been requested at this step.

3. GET: Request the Selected Full Format Route

The terminal or the user of the terminal may select one from the computed set and access full route information for the route selected by the terminal or the user of the terminal using a GET command. In a case in which the full route has been used at step 2, this step is not requested.

A route structure for expressing the route may be based on Table 2 above and a segment structure of the route structure may be based on Table 3 above. In addition, the following additional elements may be added to the segment structure to indicate a specific segment of the previously mentioned route.

TABLE 5

| Element | Type | Optional | Description |
|---|---|---|---|
| positionUpdate | xsd:boolean | Yes | If this element is present and set to true, the terminal is requested to upload its current position when the terminal enters this segment (If present and set to True, the application is requested to upload its current position when the Navigation Device enters this segment.) |

4. GET: Request Traffic Events Related to the Route

The terminal may access traffic events for selected categories related to a route which is being used using a GET command based on links to traffic event resources provided in expressing the route. Access to the traffic events may be limited to categories selected by the user. For example, the above mentioned categories mean distinction between a traffic accident and road repairing as kinds of the traffic events.

5. Delete: Remove Unnecessary Routes

The terminal may remove unnecessary routes which have been previously computed by the server but not selected by the user using a DELETE command.

6. POST: Subscription with Subscription Id

The terminal may subscribe to notification services for the trip using a POST command. The terminal may be notified of the following events by the server:

a. Performance parameter updates for all routes related to the trip and new traffic events (limited to a selected category)

b. Alternative routes in a case in which a traffic jam occurs on a current route c. The destination and/or route updated to the third party. In a case in which the trip destination is the location of the third party and the location of the third party is changed, the terminal must request a procedure of the server tracking the location of the third party from the server during subscription to the notification services in order to enable the changed information to be notified.

In other words, the terminal cannot receive any notification from the server except for the above conditions a to c. For example, in a case in which the destination, to which the condition c is applicable, is the third party, the above notification is not performed unless the location of the third party is changed.

In addition, a subscription structure for the above condition c may include the following elements.

TABLE 6

| Element | Type | Optional | Description |
| --- | --- | --- | --- |
| callbackReference | common:CallbackReference | No | Client's Notification endpoint and parameters. |
| link | common:Link [1 . . . unbounded] | No | References to resources subscribed by the application. Attribute "rel" indicates the type of resource subscribed. It may assume the following values: "Trip": in order to get notified about: new traffic events and performance parameter related to the set of routes defined for the trip new alternative route proposals "Area": in order to be notified of new traffic events and performance parameters updates Attribute "herf: specifies the URL of subscribed resource. Subscribed resource's type must be the same of that specified in "rel" attribute. Note: notified information for an existing route are: a) new traffic events provided with links included in the route resource itself; b) performance parameters available in updated performanceParameter filed of segment structures. |
| trackingProc | xsd:boolean | Yes | If present and set to True, the application communicate to the server user's availability to provide position information through an external location application. |
| deviceLocationURI | xsd:anyURI | Yes | This parameter is used by the server for accessing Navigation Device position information. |
| tracking3rdParty | xsd:boolean | Yes | If this element is present and set to true, the server tracks the $3^{rd}$ party position and notifies the availability of updated information when the $3^{rd}$ party position is changed (If present and set to True, the DynNav server tracks the $3^{rd}$ party position and notifies the availability of updated information when the $3^{rd}$ party position is changed.) |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST be also included in responses to any HTTP method that returns an entity body, and in PUT requests. |

That is, the tracking3rdParty element may be set to true, tracking of the location of the third party may be requested from the server, and a notification of update information based on the change in location of the third party may be requested from the server.

7. PUT: Modify Trip Parameters

In a case in which a vehicle having the terminal attached thereto deviates from or detours around a current route(s), the terminal may modify an origin parameter included in the trip resources using a PUT operation. In addition, in some different cases, the terminal may upload the location of the terminal to the server. The server may recognize that the current location of the terminal does not belong to the current route and may compute a new route using the new origin. The server may remove the existing route and may respond to the PUT operation using an identifier of the new route included in the expression of the trip. In a case in which the change origin parameter used for the PUT operation belongs to the above route(s), the server uses this information to remove segments which have already being travelled from the expression of the route(s).

This step (the PUT operation for the trip resources) occurs in a case in which the vehicle having the terminal attached thereto deviates from or detours around the route, in a case in which the vehicle has traveled a specific distance from the previously reported location, and in a case in which the vehicle enters a segment at which uploading of the location has been requested from the server.

8. GET: Request Route Id Resource

Since the terminal has subscribed to the notification service for the trip resources, the subscription includes all routes related to the trip, and the server will transmit a notification for new events affecting a new route, the terminal may access the newly computed route together with performance parameters and traffic events using a GET operation.

9. POST: Notify by CallBackNotifURL

In a case in which traffic events and/or a serious traffic jam and/or the change in location of the third party along the suggested routes is detected by the server, the server may notify the terminal of availability of update information for a current route and an alternative route using a POST command.

Figure 7:
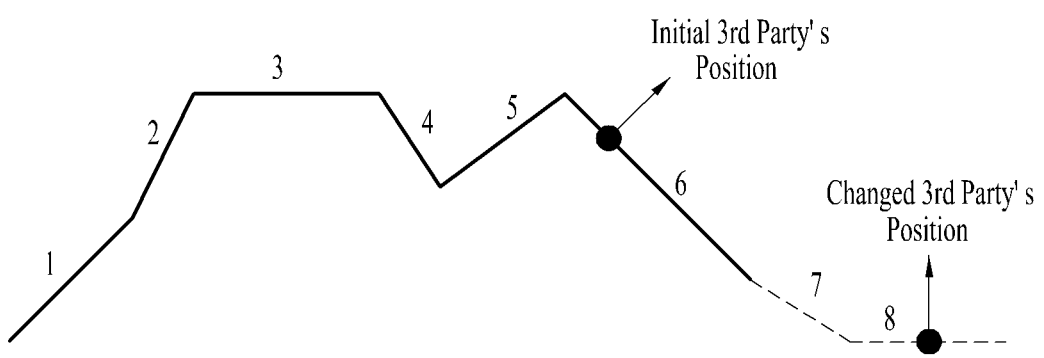
FIG. 7 is a view showing an example of update information type according to an embodiment of the present invention.

That is, in FIG. 7, when the terminal uploads the location of the terminal to the server, the server may check or detect whether the location of the third party has been changed. In addition, when the change in location of the third party is checked or detected, the server may create update information for the route based on the current location of the terminal and the current location of the third party. Creation of the update information may accompany re-computation of the route based on the current location of the terminal and the current location of the third party.

Meanwhile, as previously described, such a notification may not be performed even in a case in which the change in location of the third party has been detected. In other words, even in a case in which the change in location of the third party has been detected, the server may control a notification for the update information according to type of the update information based on the change in location of the third party in order to reduce communication load between the server and the terminal.

For example, when the update information corresponds to (1) update of the destination—that is, a case in which the changed location of the third party has been changed in the last segment of the most recently provided route and (2) the additional segment—that is, a case in which the changed location of the third party is out of the last segment of the most recently provided route and at least one segment is additionally needed to the route to arrive at the changed location of the third party, the server does not perform the notification immediately when the change in location of the third party is detected but performs the notification when the terminal enters a specific segment designated by the server. The specific segment may be indicated by the positionUpdate element described in Table 5 above. In a case in which the positionUpdate element is present in the segment information and set to true, the terminal is requested to upload the current location of the terminal to the server when the terminal enters this segment.

In addition, when the update information corresponds to (3) the alternative route—that is, a case in which the changed location of the third party is out of the last segment of the most recently provided route and at least one segment is additionally needed to the route to arrive at the changed location of the third party but an alternative route more optimized to the third party is present in addition to the route (existing route), the server may perform the notification immediately when the change in location of the third party is detected.

10. GET: Notified Updated Information

Since the subscription to the notification service includes all routes related to the trip and the notification extends to an alternative route, the terminal may access update information for the current route using a GET command and may read an alternative route using the GET command. In a case in which the location of the third party is changed, the terminal may access location information of the third part changed as the destination in the trip resources and/or the updated route resource using the GET command.

Meanwhile, in the embodiment related to FIG. 5, all of step 1 to step 10 may be sequentially performed. Alternatively, some of the steps may be separately performed. That is, it is not necessary for an embodiment of the present invention to include all of step 1 to step 10. Some necessary steps may be included and performed. A description of this will become clearer when referring to an example given at the end of the description of the embodiment related to FIG. 4.

Figure 6:
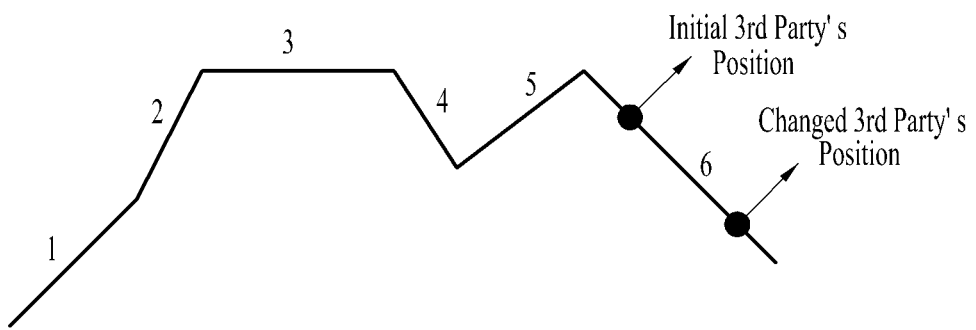
FIG. 6 is a view showing an example of update information type according to an embodiment of the present invention.

FIG. 6 is a view showing an example of update information type according to an embodiment of the present invention. In an example related to FIG. 6, it is assumed that the terminal (or a mobile means having the terminal equipped therein or attached thereto) is moving along a route received from the server at step D of FIG. 4 or at step 3 of FIG. 5. The example related to FIG. 6 is an example for the update destination (or change of the destination), which is one of the update information types.

When the location of the terminal is uploaded from the terminal, the server may check or detect whether the location of the third party corresponding to the destination of the route has been changed. When the location of the third party is changed, the server may generate update information for the route. The example related to FIG. 6 relates to a case in which the third party still stays in the last segment of the route. That is, referring to FIG. 6, it can be seen that both the initial location of the third party and the changed location of the third party are present in segment 6. In this case, it is not necessary to re-compute the route to the third party. Since the third party is located in the last segment of the route, however, the server may notify the terminal of the updated location information of the third party. The notification may be performed at a specific point of time or in a specific case, which will hereinafter be described. The terminal receiving the notification may access the update information.

FIG. 7 is a view showing an example of update information type according to an embodiment of the present invention. In an example related to FIG. 7, it is assumed that the terminal (or a mobile means having the terminal equipped therein or attached thereto) is moving along a route received from the server at step D of FIG. 4 or at step 3 of FIG. 5. The example related to FIG. 7 is an example for the additional segment (or the additional route), which is one of the update information types.

When the location of the terminal is uploaded from the terminal, the server may check or detect whether the location of the third party corresponding to the destination of the route has been changed. When the location of the third party is changed, the server may generate update information for the route based on the changed location of the third party and the uploaded location of the terminal. The example related to FIG. 7 relates to a case in which at least one segment is further needed for the third party to deviate from the route and arrive at the changed location of the third party, i.e. a case in which an additional segment is needed for the terminal to arrive at the changed location of the third party after arriving at the destination of the route. Referring to FIG. 6, it can be seen that, for example, segments 7 and 8 are further needed. The server may notify the terminal of the additional segments. The notification may be performed at a specific point of time or in a specific case, which will hereinafter be described. The additional segments may be added to the route and the terminal is notified of the updated route and the trip resources. The terminal receiving the notification may access the update information.

Figure 8:
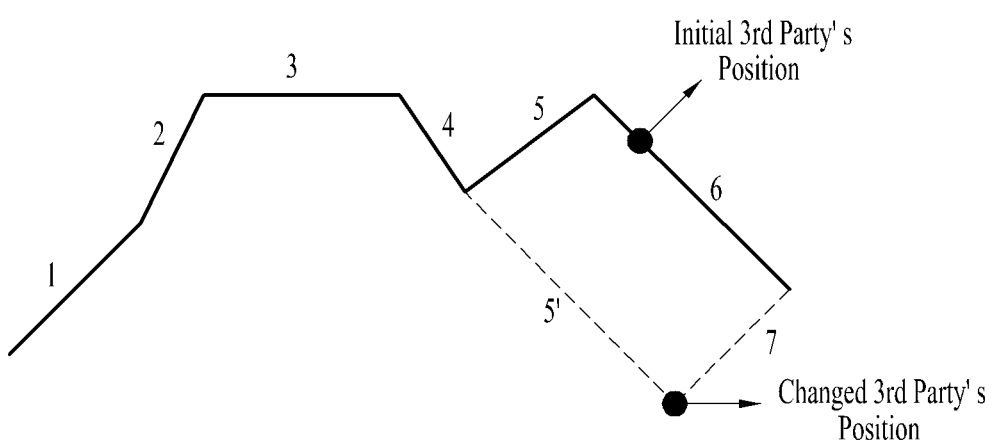
FIG. 8 is a view showing an example of update information type according to an embodiment of the present invention.

FIG. 8 is a view showing an example of update information type according to an embodiment of the present invention. In an example related to FIG. 8, it is assumed that the terminal (or a mobile means having the terminal equipped therein or attached thereto) is moving along a route received from the server at step D of FIG. 4 or at step 3 of FIG. 5. The example related to FIG. 8 is an example for the alternative route, which is one of the update information types.

When the location of the terminal is uploaded from the terminal, the server may check or detect whether the location of the third party corresponding to the destination of the route has been changed. When the location of the third party is changed, the server may generate update information for the route based on the changed location of the third party and the uploaded location of the terminal. The example related to FIG. 8 relates to a case in which at least one segment is further needed for the third party to deviate from the route and arrive at the changed location of the third party and, in addition, there is an alternative route along which the third party can arrive at the changed location of the third party faster from the location of the terminal.

The server may compute the alternative route based on the uploaded location of the terminal and the changed location of the third party. Subsequently, the server may notify the terminal of update information including the alternative route and information regarding the changed destination corresponding to the changed location of the third party. The notification may be performed at a specific point of time or in a specific case, which will hereinafter be described. The terminal may access the update information.

In the embodiments related to FIGS. 6 to 8, the notification of the update information from the server to the terminal may be performed at a specific point of time or in a specific case. In other words, different notification policies may be applied according to the update information types. Such discriminative notification policies are applied to reduce the number of times of interaction between the server and the terminal and resources of the server and the terminals.

In a case in which the update information is an alternative route, the server notifies the terminal of the update information immediately when available. That is, when the server computes or acquires an alternative route (i.e. the update information) more optimized than the existing route based on the uploaded location of the terminal and the changed location of the third party, the server may notify the terminal of availability of the update information.

In a case in which the update information is update of the destination or an additional segment, the server may notify the terminal of the update information when the terminal arrives at the vicinity of the destination of the route. The server may set positionUpdate element to the segment structure to detect whether the terminal has arrived at the vicinity of the destination of the route. For example, the server may set the positionUpdate element in segment 5 or segment 6 to detect whether the terminal has arrived at the vicinity of the destination of the route. The reason that a point of time of notification varies based on the update information will be described in more detail. In a case in which the update information is an alternative route, the server may immediately notify the terminal of the update information such that the terminal can acquire the alternative route since the alternative route is a new route completely different from the route previously computed by the server.

On the other hand, in a case in which the update information is update of the destination or an additional segment, the server may notify the terminal of the update information only when the terminal arrives at the vicinity of the destination of the previously computed route since the alternative route is equal to the route previously computed by the server or the route having only some segments added thereto. For example, on the assumption that it is detected that the location of the third party set as the destination has been changed a plurality of times N, the terminal is notified of the update information the plurality of times in the conventional art. According to the embodiment of the present invention, on the other hand, in a case in which the update information is update of the destination or an additional segment, the server may notify the terminal of the update information only when the terminal arrives at the vicinity of the destination (i.e. a segment designated as a specific segment). That is, the notification of the update information from the server to the terminal whenever the change in location of the third party is detected may cause waste of resources and power to be used for communication between the terminal and the server. For this reason, it is efficient to perform the notification of the update information when the terminal arrives at the vicinity of the destination. In the embodiments of the present invention performing this operation, the number of times of notification may be reduced from N to 1.

Figure 9:
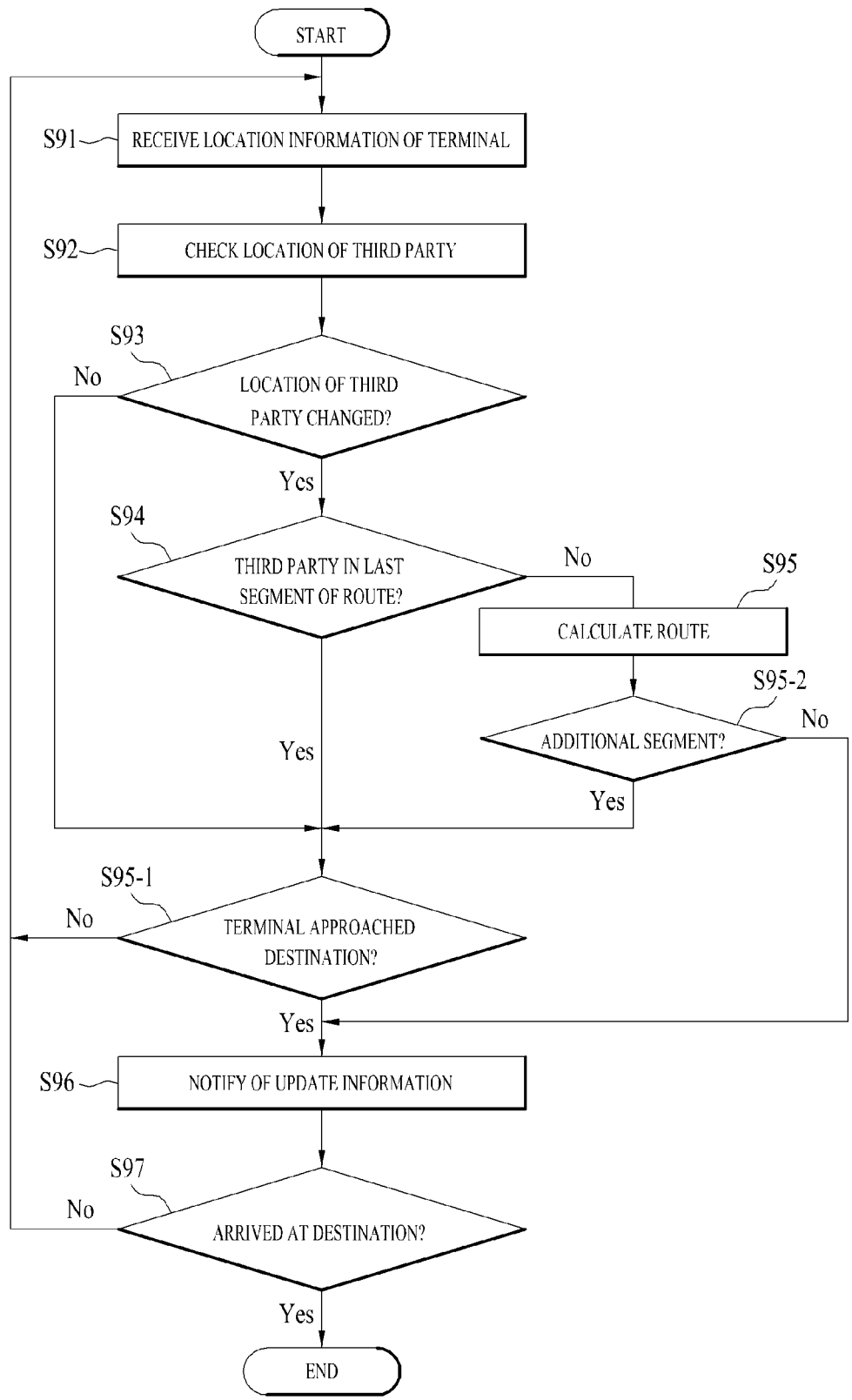
FIG. 9 is a flowchart showing an update information provision method according to an embodiment of the present invention.

FIG. 9 is a flowchart showing an update information provision method according to an embodiment of the present invention. An embodiment related to FIG. 9 relates to a case in which after a route is previously generated through information regarding a trip, i.e. information regarding to an origin and a destination, according to a request or input of the terminal and the generated route is provided to the terminal, a third party designated as the destination moves to change the destination information, as at step D of FIG. 4 or step 3 of FIG. 5.

Meanwhile, for sufficient description, a situation before the procedure shown in FIG. 9 will be described in brief. When the trip destination is requested or input by the terminal using an ID of the third party, the server may identify the third party through the ID of the third party. The server may detect the identified location of the third party through an external location server. The detected location of the third party is referred to as an "initial location of the third party" and the location of the third party at the time of request or input is referred to as an "initial location of the terminal." The server may generate a route from the initial location of the terminal to the initial location of the third party (hereinafter, referred to as an "initial route") and provide the generated route to the terminal.

The server may receive location information of the terminal (S91). In a case in which the terminal deviates from or detours around the generated initial route or in a case in which the terminal enters a specific segment on the initial route designated by the server whenever the terminal moves by a predetermined distance, the terminal may upload, report, or transmit the location information of the terminal to the server.

Upon receiving the location information of the terminal, the server may check or detect the location information of the third party designated as the destination of the trip (S92). The server may determine whether the location of the third party has been changed (S93). That is, the server may determine whether the location of the third party is different from the initial location of the third party. Steps or operations after step S93 relate to generation of update information for the initial route based on the movement of the third party (i.e. the change in location of the third party) and notification of the generated update information.

Upon determining that the location of the third party has not been changed, the procedure advances to step S95-1 and it may be determined whether the terminal has arrived at the destination, i.e. the location of the third party. When the terminal has arrived at the destination, the procedure may end. Otherwise, the procedure may return to step S91.

Upon determining at step S93 that the location of the third party has been changed, the server may check or detect whether the detected location of the third party is present in the last segment of the initial route (S94). Step S94 is performed to determine whether additional route information is needed. Upon checking or detecting that the detected location of the third party is present in the last segment of the initial route, update information for the initial route according to movement of the third party is decided as "update of the destination (or change of the destination)." That is, the third party has moved in the last segment of the initial route with the result that information regarding an additional route is not needed and only the updated or changed destination is reflected in the route information of the trip.

Upon checking or detecting that the detected location of the third party is not present in the last segment of the initial route, the procedure may advance to step S95. That the detected location of the third party is not present in the last segment of the initial route means that an additional route is further needed for the terminal to arrive at the location of the third party. Consequently, it is necessary to determine whether the additional route is a route acquired by simply adding at least one segment to the last segment of the initial route or a more optimized route, i.e. an alternative route. The server may perform route calculation based on the detected (or changed) location of the third party and the received location of the terminal (S95). In other words, the serer may generate update information for the route based on the detected (or changed) location of the third party and the received location of the terminal. The route computed at step S95 is referred to as an "update route."

The update route and the initial route may be compared to determine whether the update route is a route acquired by adding at least one segment to the initial route (S95-2). It is decided whether the update information is an "additional segment (or addition of a route)" or an "alternative route" based on the determination at step S95-2.

According to the above description, all of the update information types are checked immediately before the entry into step S95-1 of FIG. 9 or immediately after the entry into step S95-2 of FIG. 9. When the update information corresponds to the "update of the destination" or the "additional segment" in this embodiment, the procedure advances to step S95-1, at which the server may determine whether the terminal has approached the destination.

Determination as whether the terminal has approached the destination may be made based on determination as to whether the terminal has entered a specific segment on the initial route designated by the server. When the terminal has entered the specific segment, it may be determined that the terminal has approached the destination. Otherwise, it may be determined that the terminal has not approached the destination. Designation of the specific segment may be embodied as the positionUpdate element of Table 5 as previously described. The server may designate a specific segment on the initial route before the segment to which the destination belongs (for example, the first or second segment from the segment to which the destination belongs and set the positionUpdate element of the specific segment to true.

Determination as to whether the terminal has approached the destination is made to decide whether it is necessary to notify the terminal of the update information. In embodiments of the present invention, generation and notification of the update information may be performed separately. In other words, although the update information is generated due to the movement of the third party, the generation of the update information may be notified only in a specific case. In embodiments of the present invention, notification of the update information may be decided according to the type of the update information.

That is, the server may determine whether the terminal has approached the destination (S95-1). In the embodiment related to FIG. 9, in a case in which the update information is the "update of the destination (or change of the destination)" or the "additional segment (or addition of the route)," the server may notify the terminal of the update information when the terminal enters the specific segment designated by the server (S96). Otherwise, the procedure may return to step S91. In a case in which the update information is the "alternative route," on the other hand, the server may notify the terminal of the update information irrespective of the location or the movement of the terminal (S96).

After the terminal is notified of the update information, the terminal may access the update information. Such access may be performed at steps K and L of FIG. 4 and step 10 of FIG. 5. Route information in the terminal and route information in the server, i.e. information regarding the update route in the terminal and information regarding the update route in the server, become equal to each other through the access. As a result, the destination of the trip, i.e. the location of the third party and the route to the location of the third party, may be updated.

Subsequently, the server may determine whether the terminal has arrived at the destination of the trip (S97). Upon determining that the terminal has arrived at the destination, the procedure may end. Otherwise, the procedure may return to step S91.

In the embodiment related to FIG. 9, after the update information is generated, the terminal may not be notified of the update information according to circumstances. That is, in a case in which the update information is the "update of the destination (or change of the destination)" or the "additional segment (or addition of the route)," the update information is not provided to the terminal and is not stored in the server when the terminal has not approved the destination. On the other hand, the update information may be stored or temporarily stored in the server such that the update information can be continuously managed irrespective of whether the server notifies the terminal of the update information (S96). In a case in which the update information is stored or temporarily stored in the server and managed as described above, the "location of the third party" and the "route or the last segment on the route," based on which determination is made at steps S93 and S94 of FIG. 9, must be continuously updated and changed according to generation of the update information.

For example, in a case in which it is determined at step S95-1 of FIG. 9 that the terminal has not approached the destination and the notification is not needed, the server may store the generated update information in a specific storage space. After that, the generated update information may be continuously retained in the specific storage space although the terminal has not approached the destination. As previously mentioned, the stored update information is replaced with the "location of the third party" and the "route or the last segment on the route," based on which determination is made at steps S93 and S94 of FIG. 9. Consequently, the server continues to track the location of the third party.

Subsequently, when the procedure is performed from step S91 and a corresponding point of time is reached immediately before entry into step S95-1, update information is additionally generated. Subsequently, upon determining at step S95-1 that the terminal has not approached the destination, the additionally generated update information may be replaced with the "location of the third party" and the "route or the last segment on the route," based on which determination is made at steps S93 and S94 of FIG. 9. Upon determining at step S95-1 that the terminal has not approached the destination, the server may notify the terminal of update information acquired by combining the additionally generated update information and the "location of the third party" and the "route or the last segment on the route," based on which determination is made at steps S93 and S94 of FIG. 9.

That is, since at least two pieces of update information have been generated without notification to the terminal, it is necessary to combine the at least two pieces of update information. For example, in a case in which both first update information and second update information are the "addition of the segment," the server may combine the first update information and second update information, replace the combined update information with the "location of the third party" and the "route or the last segment on the route," based on which determination is made at steps S93 and S94 of FIG. 9, and notify the terminal of the replaced update information.

In another example, in a case in which first update information is the "change of the destination" and second update information is the "addition of the segment," the server may generate an update route having the first update information and the second update information reflected therein, replace the generated update route with the "location of the third party" and the "route or the last segment on the route," based on which determination is made at steps S93 and S94 of FIG. 9, and notify the terminal of the replaced update information.

Figure 10:
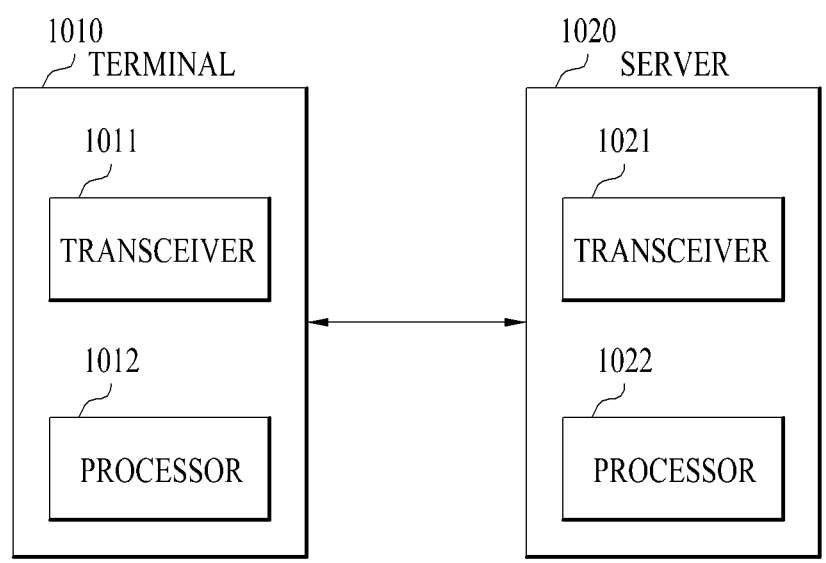
FIG. 10 is a block diagram showing a terminal and a server configured to embody embodiments of the present invention.

FIG. 10 is a block diagram showing a terminal and a server configured to embody embodiments of the present invention. The terminal 1010 may include a transceiver 1011 configured to communicate with the server 1020 and a processor 1012 configured to acquire update information for a route based on information received from the server. The server 1020 may include a transceiver 1021 configured to communicate with the terminal and a processor 1022 configured to compute or generate a route or update information for the route based on information received from the terminal or to collect and process traffic information.

These elements are configured to carry out the embodiments related to FIGS. 4 to 9 and a detailed description thereof will be omitted.

The embodiments as described above are combinations of elements and features of the present invention. The elements or features may be considered selective unless otherwise mentioned. Each element or feature may be practiced without being combined with other elements or features. In addition, an embodiment of the present invention may be constructed by combining some of the elements and/or features. Operation orders described in the embodiments of the present invention may be changed. Some elements or features of any one embodiment may be included in another embodiment or may be replaced with corresponding elements or features of another embodiment. It is obvious to those skilled in the art that claims that are not explicitly cited in each other in the appended claims may be presented in combination as an embodiment of the present invention or included as a new claim by a subsequent amendment after the application is filed.

The present invention may be carried out in other specific ways than those set forth herein without departing from the spirit and essential characteristics of the present invention. The above embodiments are therefore to be construed in all aspects as illustrative and not restrictive. The scope of the invention should be determined by rational interpretation of the appended claims and all changes coming within the equivalency range of the appended claims are intended to be embraced therein. In addition, it will be obvious that claims that do not explicitly cite each other in the appended claims may be presented in combination as an exemplary embodiment of the present invention or included as a new claim by subsequent amendment after the application is filed.

INDUSTRIAL APPLICABILITY

Embodiments of the present invention are applicable to a device or server for route computation.

The invention claimed is:

1. A method of providing, to a terminal, update information for a route comprising at least one segment from the terminal to a destination, wherein, as the destination is defined as an identifier (ID) of a third party, update information for a route in which the destination is designated as a location of the third party is provided, the method being performed by a server, the method comprising:

receiving location information of the terminal from the terminal;

determining whether the location of the third party has been changed upon receiving the location information of the terminal;

generating update information for the route based on the received location information of the terminal and the changed location of the third party upon determining that the location of the third party has been changed; and notifying the terminal of the generated update information according to a type of the generated update information, wherein the location information of the terminal is received when the terminal enters a specific segment on the route set by the server, and wherein the generated update information is one of:
- a first type indicating a case in which the changed location of the third party is in a last segment of the route,
- a second type indicating a case in which at least one segment needs to be added to the route to reach the changed location of the third party, and
- a third type indicating a case in which at least one segment needs to be added to the route to reach the changed location of the third party and an alternative route exists in addition to the route.

2. The method according to claim 1, wherein a notification policy of the generated update information is applied according to the types of the generated update information.

3. The method according to claim 1, wherein, if the generated update information is the first type or the second type, the method further comprises notifying the terminal of the generated update information when the terminal enters a specific segment of the route.

4. The method according to claim 1, wherein, if the generated update information is the third type, the method further comprises notifying the terminal of the generated update information as soon as the update information is generated.

5. The method according to claim 1, wherein the specific segment of the route is indicated by a positionUpdate element contained in information on each segment of the route.

6. The method according to claim 5, wherein, if the positionUpdate element is set to true, the location information of the terminal is received from the terminal when the terminal enters a segment containing the positionUpdate element set to true.

7. The method according to claim 1, comprising:
receiving a request for notifying of the generated update information from the terminal,
wherein the request for notifying of the generated update information contains a tracking3rdParty element, and
wherein if the tracking3rdParty element is set to true, the server is configured to track the location of the third party and to notify of availability of the generated update information.

8. A method of acquiring, from a server, update information for a route comprising at least one segment from a terminal to a destination, wherein, as the destination is defined as an identifier (ID) of a third party, update information for a route in which the destination is designated as a location of the third party is provided, the method being performed by the terminal, the method comprising:
transmitting location information of the terminal to the server;
receiving a notification of update information on the route based on the location information of the terminal and changed location of the third party from the server, the update information being generated by the server, the notification being transmitted by the server according to a type of the update information; and
accessing the update information, wherein it is determined whether the location of the third party has been changed if the location information of the terminal is received by the server, wherein the update information is generated based on the location information of the terminal received by the server and the changed location of the third party if it is determined that the location of the third party has been changed, wherein the location information of the terminal is transmitted when the terminal enters a specific segment on the route set by the server, and wherein the update information is one of:
- a first type indicating a case in which the changed location of the third party is in a last segment of the route,
- a second type indicating a case in which at least one segment needs to be added to the route to reach the changed location of the third party, and
- a third type indicating a case in which at least one segment needs to be added to the route to reach the changed location of the third party and an alternative route exists in addition to the route.

9. The method according to claim 8, wherein a notification policy of the update information is applied according to the types of the update information.

10. The method according to claim 8, wherein, if the update information is the first type or the second type, the method further comprises receiving, by the terminal, notification of the update information when the terminal enters a specific segment of the route.

11. The method according to claim 8, wherein, if the update information is the third type, the method further comprises receiving, by the terminal, notification of the update information as soon as the update information is generated.

12. The method according to claim 8, wherein the specific segment of the route is indicated by a positionUpdate element contained in information for each segment of the route.

13. The method according to claim 12, wherein, if the positionUpdate element is set to true, the location information of the terminal is received from the terminal when the terminal enters a segment containing the positionUpdate element set to true.

14. The method according to claim 8, comprising:
transmitting a request for notifying of the update information to the server, wherein the request for notifying of the update information contains a tracking3rdParty element, and
wherein, if the tracking3rdParty element is set to true, the server is configured to track the location of the third party and to notify of availability of the update information.

15. A server configured to provide, to a terminal, update information for a route comprising at least one segment from the terminal to a destination, wherein, as the destination is defined as an identifier (ID) of a third party, update information for a route in which the destination is designated as a location of the third party is provided, the server comprising:
a transceiver configured to communicate with the terminal; and
a processor configured to:
generate update information for the route based on information received from the terminal,
receive location information of the terminal from the terminal through the transceiver, determine whether the location of the third party has been changed upon receiving the location information of the terminal, generate update information based on the received location information of the terminal and the changed location of the third party upon determining that the location of the third party has been changed, and notify the terminal of the generated update information through the transceiver according to a type of the generated update information, wherein the location information of the terminal is received when the terminal enters a specific segment on the route set by the server, and wherein the generated update information is one of:
  a first type indicating a case in which the changed location of the third party is in a last segment of the route,
  a second type indicating a case in which at least one segment needs to be added to the route to reach the changed location of the third party, and
  a third type indicating a case in which at least one segment needs to be added to the route to reach the changed location of the third party and an alternative route exists in addition to the route.

16. The server according to claim 15, wherein a notification policy of the generated update information is applied according to the types of the generated update information.

17. A terminal configured to acquire, from a server, update information for a route comprising at least one segment from the terminal to a destination, wherein, as the destination is defined as an identifier (ID) of a third party, update information for a route in which the destination is designated as a location of the third party is provided, the terminal comprising:
  a transceiver configured to communicate with the server; and
  a processor configured to
    acquire update information for the route based on information received from the server,
    transmit location information of the terminal to the server through the transceiver, and
    receive a notification of update information based on the location information of the terminal and changed location of the third party from the server,
  wherein the update information is generated by the server, and
  wherein the notification is transmitted by the server according to a type of the update information, and
  access the update information,
  wherein it is determined whether the location of the third party has been changed when the location information of the terminal is received by the server,
  wherein the update information is generated based on the location information of the terminal received by the server and the changed location of the third party when it is determined that the location of the third party has been changed,
  wherein the location information of the terminal is transmitted when the terminal enters a specific segment on the route set by the server, and
  wherein the update information is one of:
    a first type indicating a case in which the changed location of the third party is in a last segment of the route,
    a second type indicating a case in which at least one segment needs to be added to the route to reach the changed location of the third party, and
    a third type indicating a case in which at least one segment needs to be added to the route to reach the changed location of the third party and an alternative route exists in addition to the route.

18. The terminal according to claim 17, wherein a notification policy of the update information is applied according to the types of the update information.

* * * * *